US010696887B2

(12) United States Patent
Dismuke et al.

(10) Patent No.: US 10,696,887 B2
(45) Date of Patent: Jun. 30, 2020

(54) OXIDATIVE BREAKERS IN A SILICONE BASED SUSPENSION

(71) Applicant: Flotek Chemistry, LLC, Houston, TX (US)

(72) Inventors: Keith Ingram Dismuke, Katy, TX (US); David Philpot, Marlow, OK (US); Randal M. Hill, The Woodlands, TX (US); Rondell Pennypacker, Duncan, OK (US); Steven Hill, Marlow, OK (US); Thomas R. Sifferman, Carrollton, TX (US)

(73) Assignee: Flotek Chemistry, LLC, Houston, TX (US)

( * ) Notice: Subject to any disclaimer, the term of this patent is extended or adjusted under 35 U.S.C. 154(b) by 127 days.

(21) Appl. No.: 15/595,878

(22) Filed: May 15, 2017

(65) Prior Publication Data

US 2017/0313925 A1     Nov. 2, 2017

Related U.S. Application Data

(63) Continuation-in-part of application No. 14/055,862, filed on Oct. 16, 2013, now abandoned, which is a
(Continued)

(51) Int. Cl.
| | |
|---|---|
| *C09K 8/03* | (2006.01) |
| *C09K 8/58* | (2006.01) |
| *C09K 8/524* | (2006.01) |

(52) U.S. Cl.
CPC ............... *C09K 8/03* (2013.01); *C09K 8/524* (2013.01); *C09K 8/58* (2013.01); *C09K 2208/26* (2013.01)

(58) Field of Classification Search
CPC .......... C09K 8/03; C09K 8/035; C09K 8/588; C09K 2208/26
See application file for complete search history.

(56) References Cited

U.S. PATENT DOCUMENTS

| | | | |
|---|---|---|---|
| 4,010,110 A * | 3/1977 | Cosentino | .......... B01D 19/0404 252/180 |
| 4,259,205 A | 3/1981 | Murphey, Jr. | |

(Continued)

FOREIGN PATENT DOCUMENTS

| | | |
|---|---|---|
| WO | WO 1994/002540 | 2/1994 |
| WO | WO 2012/054107 | 4/2012 |

OTHER PUBLICATIONS

International Search Report and Written Opinion dated Aug. 5, 2014 for Application No. PCT/US2014/28047.
(Continued)

*Primary Examiner* — Aiqun Li
(74) *Attorney, Agent, or Firm* — Wolf, Greenfield & Sacks, P.C.

(57) ABSTRACT

An oxidative breaker system for use in reducing the viscosity of a polysaccharide-based or derivatized polysaccharide-based suspension includes a silicone carrier fluid, an oxidizer, and a suspension aid. The suspension aid is preferably fumed silica. The oxidizer may be selected from the group consisting of alkali metal peroxide, transition metal peroxide, persulfate compound, bromide compound, and bromate compound. In highly preferred embodiments, the oxidizer is magnesium peroxide or calcium peroxide. Alternative carrier fluids and suspension agents are also included in the art. Also disclosed is a method for breaking a polysaccharide-based suspension with the inventive oxidative breaker system.

7 Claims, 2 Drawing Sheets

Related U.S. Application Data continuation-in-part of application No. 13/830,925, filed on Mar. 14, 2013, now abandoned.

(56) References Cited

U.S. PATENT DOCUMENTS

| | | | |
|---|---|---|---|
| 4,732,694 | A | 3/1988 | Gowland et al. |
| 5,106,518 | A | 4/1992 | Cooney et al. |
| 5,806,597 | A | 9/1998 | Tjon-Joe-Pin et al. |
| 5,919,441 | A | 7/1999 | Mendolia et al. |
| 5,931,168 | A | 8/1999 | Abercrombie et al. |
| 6,138,760 | A | 10/2000 | Lopez et al. |
| 6,225,262 | B1 * | 5/2001 | Irwin .................. C09K 8/62 166/270 |
| 6,423,322 | B1 | 7/2002 | Fry |
| 6,914,040 | B2 | 7/2005 | Deak et al. |
| 7,485,373 | B2 | 2/2009 | Krzysik et al. |
| 7,712,535 | B2 | 5/2010 | Venditto et al. |
| 8,129,441 | B2 | 3/2012 | Lafuente Cerda et al. |
| 8,227,382 | B2 | 7/2012 | Dakin et al. |
| 2005/0075497 | A1 | 4/2005 | Utz et al. |
| 2005/0202977 | A1 | 9/2005 | Shumway et al. |
| 2006/0223714 | A1 | 10/2006 | Svoboda et al. |
| 2007/0014823 | A1 | 1/2007 | Iwata et al. |
| 2008/0070806 | A1 | 3/2008 | Lin et al. |
| 2008/0099207 | A1 * | 5/2008 | Venditto .................. C09K 8/52 166/308.3 |
| 2009/0158533 | A1 | 6/2009 | Hercouet |
| 2009/0221453 | A1 | 9/2009 | Mukhopadhyay |
| 2009/0318571 | A1 | 12/2009 | Utz et al. |
| 2010/0307744 | A1 | 12/2010 | Cochet et al. |
| 2011/0036577 | A1 | 2/2011 | Barmatov et al. |
| 2012/0035085 | A1 | 2/2012 | Parnell et al. |
| 2012/0322697 | A1 * | 12/2012 | Zhang .................. C09K 8/68 507/205 |
| 2013/0167862 | A1 | 7/2013 | Lopez et al. |
| 2014/0262274 | A1 | 9/2014 | Dismuke et al. |
| 2014/0274822 | A1 | 9/2014 | Dismuke et al. |

OTHER PUBLICATIONS

Breake® Product Catalog, TBC-Brinadd, LLC., 2012.
Rome et al., Silicone in the Oil and Gas Industry. Dow Corning Corporation. Sep. 2002.

* cited by examiner

OXIDATIVE BREAKERS IN A SILICONE BASED SUSPENSION

The present application is a continuation-in-part of U.S. patent application Ser. No. 14/055,862 filed Oct. 16, 2013 which is a continuation-in-part of U.S. patent application Ser. No. 13/830,925 filed Mar. 14, 2013 entitled Oxidative Breakers in a Silicone Suspension, the disclosures both of which are herein incorporated by reference in their entirities.

FIELD OF THE INVENTION

The present invention generally relates to the production of petroleum and more particularly to compositions and processes for improving the recovery of oil and gas from a subterranean geological formation.

BACKGROUND OF THE INVENTION

For many years, oil and gas have been recovered from subterranean reservoirs through the use of drilled wells and production equipment. In many cases, it is desirable to utilize hydraulic fracturing techniques to improve primary and secondary recovery of oil and natural gas from the target reservoir. Hydrophilic polysaccharides and derivatized polysaccharides (such as guar gum, Carboxymethyl Hydroxypropyl Guar Gum [CMHPG], and Hydroxypropyl Guar Gum [HPG]) are often used to form viscosified fluids during hydraulic fracturing operations. These viscosified fluids are non-Newtonian and also can be cross-linked to give high gel strengths.

Following the well treatment operation, it is often desirable to retrieve the viscosified fluids from the wellbore. To promote flowback from the well, these viscosified fluids can be broken, or chemically degraded, to reduce the viscosity of the suspension. In many cases, "breakers" are introduced to facilitate and expedite the process of breaking the viscosified fluids. The loss of viscosity is typically the result of an oxidative/reductive chemical mechanism.

The oxidative/reductive degradation of the polysaccharide is commonly used to reduce the viscosity of the viscosified fluids. The oxidation of the polysaccharide is typically accomplished through a radical pathway in the presence of oxygen. Current oxidative type breakers frequently employ peroxide compounds slurried in a carrier fluid. Previously used carrier fluids have included hydrocarbon liquids such as diesel.

The use of a slurry of a powdered peroxide compound in a hydrocarbon liquid such as diesel has obvious safety problems. Hydrocarbon liquids such as diesel are combustible and flammable. Making and handling a slurry of an oxidizer in such a hydrocarbon liquid necessitates special handling procedures. In addition, slurries of powdered materials in these liquids do not exhibit long-term stability. The limited shelf life of these carrier fluids mandates that the breaker fluid be used promptly after the carrier fluid and oxidizer are mixed. Hydrocarbon liquids such as diesel can also be health and environmental hazards.

There is, therefore, a need for an improved oxidative breaker system that overcomes these and other deficiencies in the prior art.

SUMMARY OF THE INVENTION

The present invention generally provides an improved oxidative breaker system that features improved safety, handling, transportation, logistics, environmental, and operational characteristics. For example, the present invention discloses an oxidative breaker system slurried into a silicone fluid. The advantage of using a silicone fluid is its characteristic of reduced flammability, which provides for improved safety in terms of handling, transporting, logistics, and use. In addition, the present invention discloses an oxidative breaker system that has a shelf-life of up to about 3 months. Some similarly commercially available oxidative breaker systems known in the prior art would only exhibit a shelf-life up to about 1 or 2 days, typically, and in some cases, perhaps up to 3 weeks. In general, the limited shelf-life of such oxidative breaker systems mandates that the system be used promptly after the carrier fluid and oxidizer are mixed in the system. From a handling, transportation, logistics, and operations standpoint, it is more desirable to have an oxidative breaker system that has a relatively long shelf-life, which provides greater flexibility of when the products must be used in an oil and/or gas well, before their performance deteriorates. Presently preferred embodiments of the invention include an oxidative breaker system for use in reducing the viscosity of a polysaccharide-based suspension. The oxidative breaker system preferably includes a silicone carrier fluid (preferably silicone oil), an oxidizer and a suspension aid. The suspension aid is preferably fumed silica. The oxidizer may be selected from the group consisting of alkali metal peroxide, transition metal peroxide, persulfate compounds, bromide compounds, and bromate compounds. In highly preferred embodiments, the oxidizer is magnesium peroxide or calcium peroxide.

In another aspect, preferred embodiments of the present invention include a method for reducing the viscosity of a polysaccharide-based high viscosity fluid in a downhole environment. The method includes the step of providing an oxidative breaker system, wherein the step of providing an oxidative breaker system comprises the step of mixing an oxidizer with a suspension aid in a silicone carrier fluid (preferably silicone oil). The method continues by placing the oxidative breaker system in contact with the polysaccharide-based fluid. The method also includes the step of oxidizing the polysaccharide-based fluid with the oxidative breaker system to reduce the viscosity of the polysaccharide-based fluid.

DETAILED DESCRIPTION OF PREFERRED EMBODIMENTS

Figure 1:
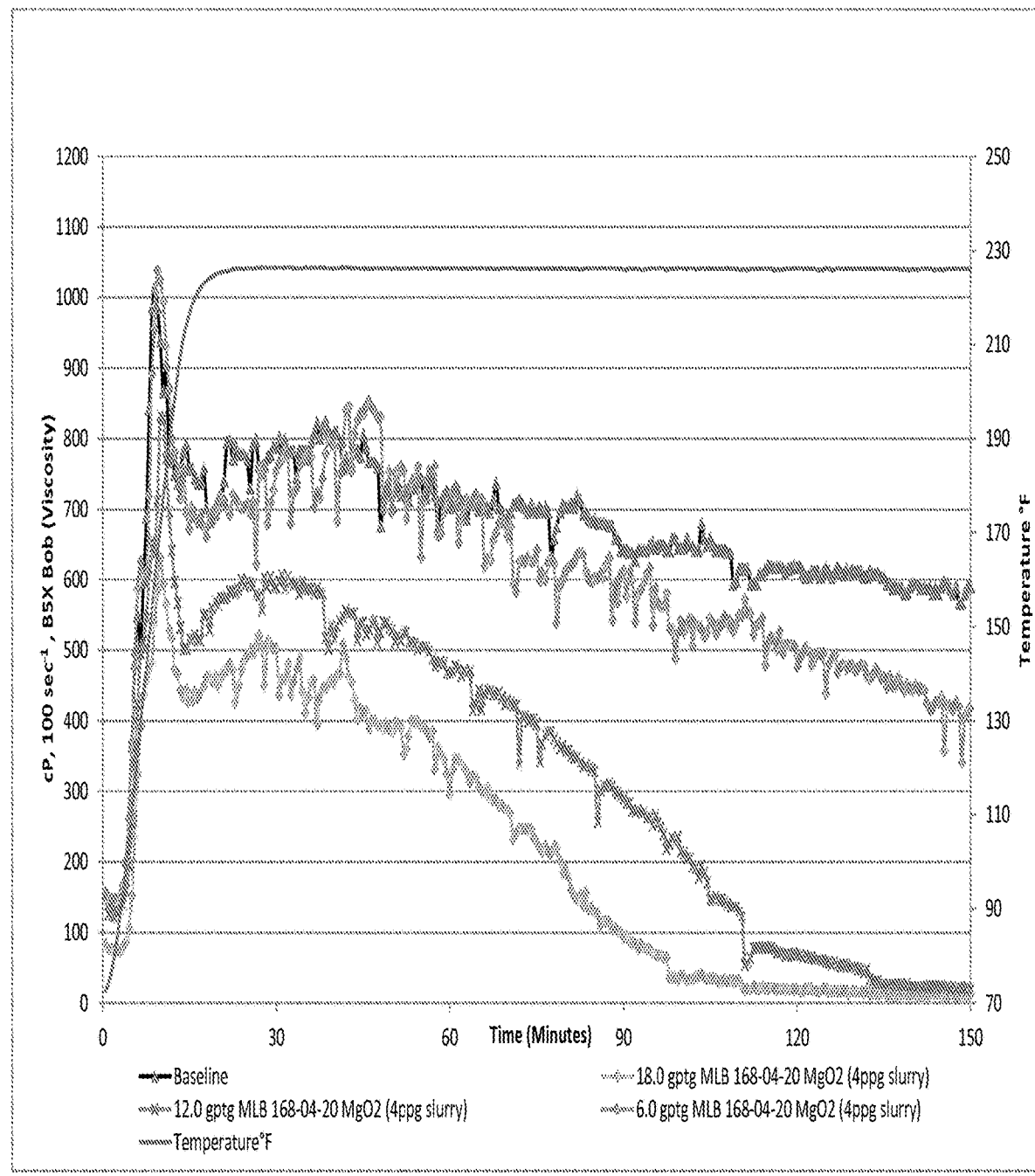
FIG. 1 presents a graph of the results of a laboratory test in which a first preferred embodiment of the oxidative breaker system reduced the viscosity of a standard guar suspension.

The present invention generally provides an improved oxidative breaker system that features improved safety, handling, transportation, logistics, environmental, and operational characteristics. For example, the present invention discloses an oxidative breaker system slurried into a silicone fluid. The advantage of using a silicone fluid is its characteristic of reduced flammability, which provides for improved safety in terms of handling, transporting, logistics, and use. In addition, the present invention discloses an oxidative breaker system that has a shelf-life of up to about 3 months. Some similarly commercially available oxidative breaker systems known in the prior art would only exhibit a shelf-life up to about 1 or 2 days, typically, and in some cases, perhaps up to 3 weeks. In general, the limited shelf-life of such oxidative breaker systems mandates that the system be used promptly after the carrier fluid and oxidizer are mixed in the system. From a handling, transportation, logistics, and operations standpoint, it is more desirable to have an oxidative breaker system that has a relatively long shelf-life, which provides greater flexibility of when the products must be used in an oil and/or gas well, before their performance deteriorates. The present invention generally provides an improved oxidative breaker system for use in reducing the viscosity of polysaccharide polymer-based fluids in a downhole environment. The inventive oxidative breaker systems include a carrier fluid, a suspension aid and an oxidizer. The oxidative breaker systems can be pumped downhole to reduce the viscosity of polysaccharide polymer-based fluids used in any well treatment operation, including, but not limited to, drilling, acidizing, hydraulic fracturing, cementing and water removal operations.

The water soluble polysaccharide polymers may be any of such polymers well known in the art. See for example the book "Handbook of Water-Soluble Gums and Resins," Robert L. Davidson, Editor, McGraw-Hill Book Co., 1980, incorporated herein by reference. Representative polymers include water soluble salts of alginic acid, carrageenan, gum agar, gum arabic, gum ghatti, gum karaya, gum tragacanth, locust bean gum, tamarind gum, cellulose derivatives such as hydroxyethyl cellulose, hydroxypropyl cellulose, carboxymethyl cellulose, hydroxyethyl carboxymethyl cellulose, and the alkyl cellulose ethers, starch ether derivatives such as carboxymethyl starch, hydroxyethyl starch, hydroxypropyl starch, and crosslinked starch ethers, guar gum and its derivatives, such as hydroxypropyl guar, hydroxyethyl guar and carboxymethyl guar, biopolymers such as xanthan gum, gellan gum, welan gum, and the like. The polysaccharide polymer is typically a cellulose ether, a starch ether which may be crosslinked, a modified guar gum, xanthan gum, gellan gum, welan gum, or mixtures thereof.

In presently preferred embodiments, the carrier fluid is preferably a silicone fluid. Suitable silicone fluids include liquid polymerized siloxanes with organic side chains, which include polydimethylsiloxanes. Suitable silicone fluids have a base viscosity of between about 50 and 1000 cSt. Particularly preferred silicone fluids include medium viscosity polydimethylsiloxanes having a base kinematic viscosity of about 350 cSt. The use of silicone fluid as a carrier fluid for an oxidative breaker system has not been recognized in the prior art. Silicone fluid has not been used in the past because of its perceived inadequacies in acting as a suspension material. The relatively high cost of silicone fluid further discourages its use in this context.

In particularly preferred embodiments, the carrier fluid is selected as a blend of octamethylcyclotetrasiloxane and decamethylcyclopentasiloxane (hereinafter "Component A"); high molecular weight cross-linked polydimethylsiloxane and octamethylcyclotetrasiloxane (hereinafter "Component B"); an 80/20 blend of Component A with Component B; 3-Hydroxypropyl-terminated polydimethyl siloxane; hydroxyalkyl-terminated polydimethyl siloxane; triacetin; polydimethylsiloxane-polyoxyethylene-polyoxypropylene copolymer (viscosity 1500-2000 cSt); polydimethylsiloxane-polyoxyethylenepolyoxypropylene copolymer (viscosity 1500-2000 cSt); polydimethylsiloxane-polyoxypropylene copolymer (viscosity <350 cSt); and trimethyl silyl terminated polydimethylsiloxane (viscosity 50-1000 cSt).

In particularly preferred embodiments, the carrier fluid is a cross-linked silicone fluid, such as an 80/20 weight percent blend of: (1) a cyclotetrasiloxane and cyclopentasiloxane combined with (2) a mixture of high molecular weight silicone elastomers (dimethicone crosspolymer) in cyclopentasiloxane.

Alternate preferred carrier fluids include carbinol end-capped silicone fluids (lower than 350 cSt), silicone-EO-PO copolymer (viscosity 1500-2000 cSt), silicone-PO copolymer (lower than 350 cSt), and silicone-EO-PO copolymer (viscosity 1500-2000 cSt).

Presently preferred suspension aids include fumed silica. In alternative embodiments, the suspension aids include fused amorphous silica, such as diatomaceous earth (DE); tallow amines, polyamide thixotropes, organic derivatives of bentonite clay, hydrated amorphous silica, a tall oil fatty acid, anionic viscosifier for drilling fluids, non-polar, high molecular weight polyisobutylene (PIB), and oligoglycerol fatty acid esters.

In yet additional alternate embodiments, the suspension aid is a tallow amine such as Ethomeen T12, a polyamide thixatrope such as Thixatrol RM, an organic derivative of bentonite clay such as Bentone 150 or Bentone 155, a polyamide Thixatrope such as Thixatrol DW 50, an hydrated amorphous silica such as Hi-Sil, a tall oil fatty acid such as Mead Westvaco's L-5, a non-polar, high molecular weight polyisobutylene such as Paratac XT, an anionic viscosifier for drilling fluids such as Polymax 1000 or aluminum oxide or emery.

Various combinations of these preferred carrier fluids and suspension aids have been found in laboratory testing to produce suspensions of varying stability. The stability of these various combination is summarized in the following table:

| Carrier Fluid | Suspending Aid | Suspension Timeframes |
|---|---|---|
| A blend of octamethylcyclotetrasiloxane and decamthylcyclopentasiloxane (component A) | A mixture of high molecular weight crossed-linked polydimethylsiloxane and octamethylcyclotetrasiloxane (component B) | 2 days stability |
| An 80/20 blend of component A and component B | Fumed Silica | 3 week stability |
| 3-Hydroxypropyl-terminated polydimethyl siloxane | | 1 day stability |
| hydroxyalkyl-terminated polydimethyl siloxane | Fumed Silica | 1 week stability |
| Triacetin | | 8 week stability |
| Polydimethylsiloxane-polyoxyethylene-Polyoxypropylene copolymer (viscosity 1500-2000 cSt) | | Less than one hour stability |
| Polydimethylsiloxane-polyoxyethylene-polyoxypropylene copolymer (viscosity 1500-2000 cSt) | | Less than one hour stability |
| Polydimethylsiloxane-polyoxypropylene copolymer (viscosity <350 cSt) | | 7 week stability |
| trimethyl silyl terminated polydimethylsiloxane, (viscosity 50-1000 cSt) | Diatomaceous Earth | 1 week stability |
| | Tallow Amine such as Ethomeen T12 | 1 week stability |
| | Polyamide Thixatrope such as Thixatrol RM | 1 week stability |

-continued

| Carrier Fluid | Suspending Aid | Suspension Timeframes |
| --- | --- | --- |
| trimethyl silyl terminated polydimethylsiloxane, (viscosity 50-1000 cSt) | An organic derivative of bentonite clay such as Bentone 150 | 3 week stability |
| | Polyamide Thixatrope such as Thixatrol DW 50 | 2 days stability |
| | An organic derivative of bentonite clay such as Bentone 155 | 3 week stability |
| | Hydrated Amorphous silica such as Hi-Sil | 2 days stability |
| | A tall oil fatty acid such as Mead Westvaco's L-5 | 1 week stability |
| trimethyl silyl terminated polydimethylsiloxane, (viscosity 50-1000 cSt) | A non-polar, high molecular weight polyisobutylene such as Paratac XT | Less than one hour stability |
| | Anionic viscosifier for drilling fluids such as Polymax 1000 | 2 week stability |
| | Aluminum oxide or emery | Less than one hour stability |

Preferred oxidizers are solid and include alkali or transition metal peroxides, persulfate compounds, bromide compounds, hypochlorite compounds, and bromates compounds. Particularly preferred oxidizers include magnesium peroxide and calcium peroxide. The oxidizer and suspension aids are preferably mixed together under mechanical agitation with the silicone fluid carrier fluid to prepare the oxidative breaker system.

In a first preferred embodiment, the preferred oxidative breaker system includes between about 50% and 70% by weight silicone fluid, between about 30% and 45% by weight magnesium peroxide, and between about 0% and 2% by weight fumed silica. The oxidative breaker system is preferably presented in a ratio of about 3.5 to about 5.5 pounds of magnesium peroxide per gallon of the oxidative breaker system.

In a highly preferred embodiment, the oxidative breaker system includes about 54% by weight silicone fluid, about 45% by weight magnesium peroxide and about 1% by weight fumed silica. This highly preferred embodiment is presented at a ratio of about 5 pounds of active magnesium peroxide to a gallon of the oxidative breaker system.

The oxidative breaker system optionally includes a dispersing agent. The dispersing agent can be used to accelerate the release of the oxidizer from the oxidative breaker system. Suitable dispersing agents include polydimethylsiloxane-polyalkylene oxide copolymers and polydimethylpolyphenylmethy-siloxane copolymers.

In a laboratory test, the first preferred embodiment of the oxidative breaker system successfully reduced the viscosity of a standard guar suspension. The oxidative breaker system was applied to a guar suspension prepared at a ratio of about 40 pounds of guar (GA-40W) to 1000 gallons of buffered tap water. The oxidative breaker system was prepared using about one pound of active magnesium peroxide to one gallon of the oxidative breaker system. The results of this test are presented in FIG. 1. The test reveals that an increasing concentration of the oxidative breaker system accelerates the reduction in the viscosity of the guar suspension.

In a second preferred embodiment, the preferred oxidative breaker system includes between about 55% and 70% by weight silicone fluid, between about 25% and 45% by weight calcium hydroxide, and between about 0% and 2% by weight fumed silica. The oxidative breaker system is preferably presented in a ratio of about 3.0 to about 5.0 pounds of calcium oxide per gallon of the oxidative breaker system.

In a highly preferred embodiment, the second preferred embodiment of the oxidative breaker system includes about 64% by weight silicone fluid, about 35.6% by weight calcium peroxide and about 0.4% by weight fumed silica. This highly preferred embodiment is presented at a ratio of about 3.73 pounds of active calcium peroxide to a gallon of the oxidative breaker system.

Figure 2:
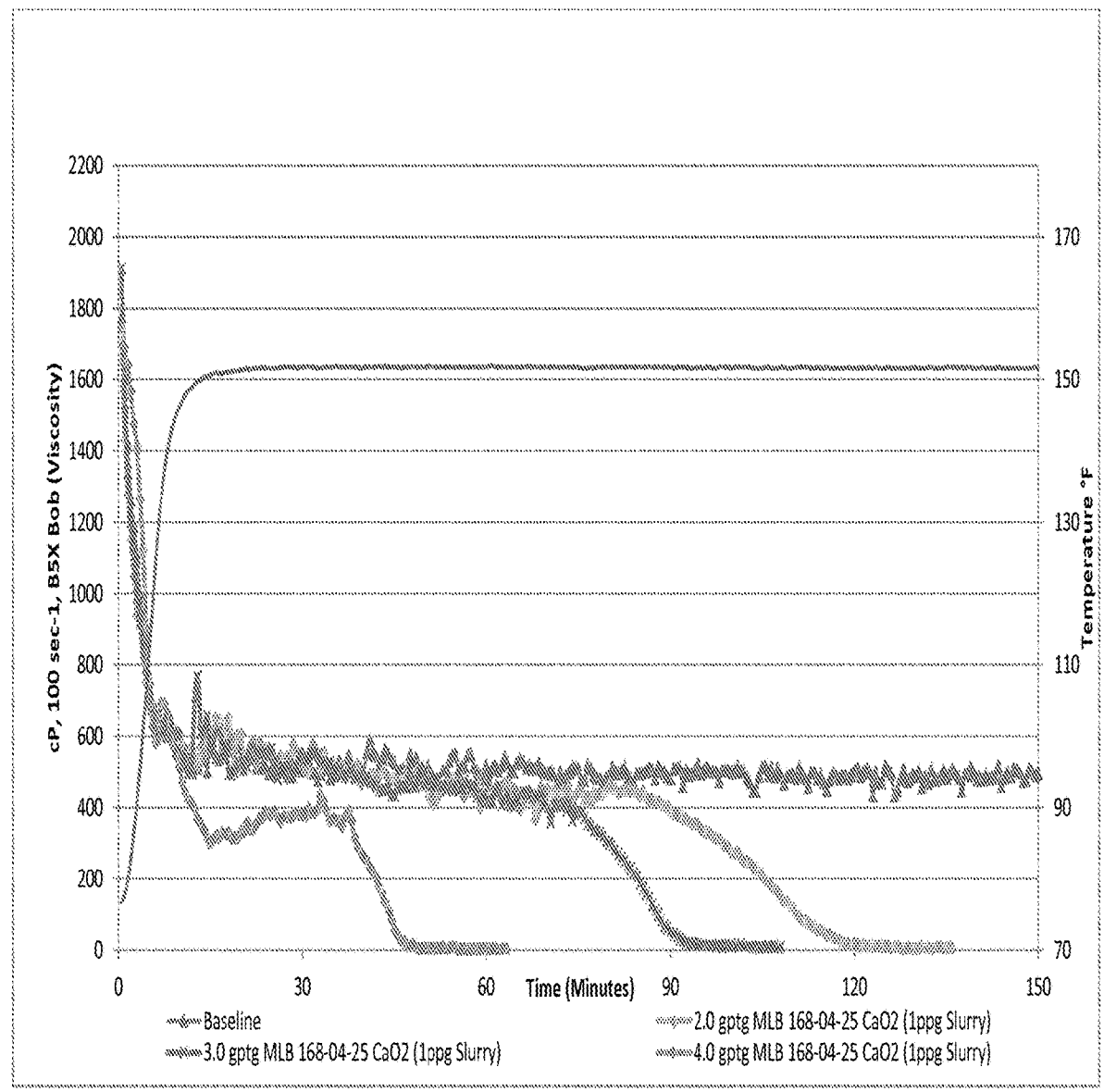
FIG. 2 presents a graph of the results of a laboratory test in which a second preferred embodiment of the oxidative breaker system reduced the viscosity of a standard guar suspension.

In a laboratory test, the second preferred embodiment of the oxidative breaker system successfully reduced the viscosity of a standard guar suspension. The oxidative breaker system was applied to a guar suspension prepared at a ratio of about 30 pounds of guar (GA-40W) to 1000 gallons of buffered tap water. The oxidative breaker system was prepared using about one pound of active calcium peroxide to one gallon of the oxidative breaker system. The results of this test are presented in the graphic in FIG. 2. The test reveals that an increasing concentration of the oxidative breaker system accelerates the reduction in the viscosity of the guar suspension.

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed, as defined in the written description and appended claims. For example, surfactant and surfactant mixture selections can be modified and changed to take into account varying reservoir conditions.

It is claimed:

1. A method for reducing the viscosity of a polysaccharide-based fluid in a downhole environment, the method comprising the steps:
   providing an oxidative breaker system, wherein the step of providing the oxidative breaker system comprises the step of mixing an oxidizer with a suspension aid in a silicone carrier fluid, wherein the silicone carrier fluid comprises a blend of octamethylcyclotetrasiloxane and decamethylcyclopentasiloxane with high molecular weight cross-linked polydimethylsiloxane and octamethylcyclotetrasiloxane;
   placing the oxidative breaker system in contact with the polysaccharide-based fluid; and
   oxidizing the polysaccharide-based fluid with the oxidative breaker system to reduce the viscosity of the polysaccharide-based fluid.

2. The method of claim 1, wherein the suspension aid comprises fumed silica.

3. A method for reducing the viscosity of a polysaccharide-based fluid in a downhole environment, the method comprising the steps:
   providing an oxidative breaker system, wherein the step of providing the oxidative breaker system comprises the step of mixing an oxidizer with a suspension aid in a silicone carrier fluid, wherein the silicone carrier fluid comprises about 80% blend of octamethylcyclotetrasiloxane and decamethylcyclopentasiloxane; and about 20% blend of high molecular weight cross-linked polydimethylsiloxane and octamethylcyclotetrasiloxane;

placing the oxidative breaker system in contact with the polysaccharide-based fluid; and oxidizing the polysaccharide-based fluid with the oxidative breaker system to reduce the viscosity of the polysaccharide-based fluid.

4. The method of claim 3, wherein the suspension aid comprises fumed silica.

5. A method for reducing the viscosity of a polysaccharide-based fluid in a downhole environment, the method comprising the steps:

providing an oxidative breaker system, wherein the step of providing the oxidative breaker system comprises the step of mixing an oxidizer with a suspension aid in a silicone carrier fluid, wherein the silicone carrier fluid comprises a cross-linked silicone fluid and the suspension aid comprises fumed silica;

placing the oxidative breaker system in contact with the polysaccharide-based fluid; and oxidizing the polysaccharide-based fluid with the oxidative breaker system to reduce the viscosity of the polysaccharide-based fluid.

6. The method of claim 5, wherein the silicone carrier fluid comprises: about 80% by weight mixture of cyclotetrasiloxane and cyclopentasiloxane; and about 20% by weight mixture of high molecular weight silicone elastomers in cyclopentasiloxane.

7. The method of claim 5, wherein the silicone carrier fluid comprises a polydimethylsiloxane-polyoxypropylene copolymer.

* * * * *